Aug. 27, 1929.  C. A. F. LINDE  1,726,356
MACHINE FOR CUTTING MEAT
Filed April 27, 1927
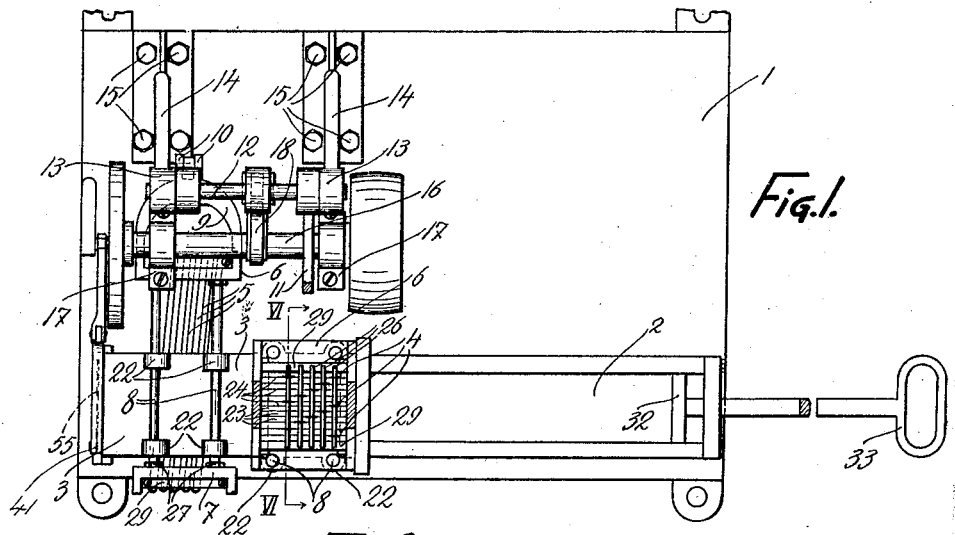

Patented Aug. 27, 1929.

1,726,356

UNITED STATES PATENT OFFICE.

CARL ALFRED FERDINAND LINDE, OF SUNDBYBERG, SWEDEN.

MACHINE FOR CUTTING MEAT.

Application filed April 27, 1927, Serial No. 187,023, and in Sweden February 25, 1922.

This invention has for its object improvements in machines for cutting pork or other suitable meat into slices, strings or small cubes.

An embodiment of the invention is described below and shown in the accompanying drawing in different views and sections, and where Figure 1 is a plan view and Figure 2 is an end view of the machine in full, Figure 3 is a partial end view with the shown members in other positions, Figure 4 is a detail on a larger scale, viewed from the top, Figure 5 is a perspective of a detail, Figure 6 is a section on the line VI to VI in Figure 1, viewed in the direction of the arrow, Figure 7 is a detail, Figure 8 is a perspective section on the line VIII to VIII in Figure 6, Figure 9 shows a detail, Figures 6 to 9 are drawn on a larger scale.

1 is the base plate of the machine, 2 is a groove where the meat to be cut is placed, 3 is a drum forming a continuation of the said groove. Knives 4 and 5 are arranged so as to have a substantially endwise reciproating motion through the said drum. The knives 4 are disposed in one group and the knives 5 in another separate group crossing the former one, as shown in Figure 2 where the knives, however, are cut away close by the drum, for the sake of clearness. Each group of knives is jammed in its holder which consists of two cross-pieces in the shape of frames, one marked by 6 and the other by 7 and being kept together by four rods 8. Both holders being similarly formed they are here marked by the same letters. The frame 6 is shown separately in Figure 5. The frame 7 differs from the frame 6 only by its lacking the arch 9. The said arch is provided with two ears 10 for enabling a lever 11 to be pivoted to the frame. The said lever is fixed to a shaft 12 rotating in two bearings 13 supported each by one bracket 14. The said brackets are fixed to the plate 1 by bolts 15, and they support a driving shaft 16 rotating in bearings 17 and provided with an eccentric 18 by which a reciprocating motion is imparted to an arm 19 located on the shaft 12 between the two levers 11. By the shaft 12 the said reciprocating motion is transmitted to the two levers 11. As each lever is connected with the corresponding frame 6 by a journal 20 which has a certain freedom of motion in a slot 21 of the lever 11 the same imparts to the corresponding knife-holder 6, 7, 8 a rectilinear reciprocating or up- and downward motion. The rods 8 run in holes on ears or the like 22 of the drum by which they are guided as required. Instead of one eccentric common to both knife-holders one may use one eccentric for each holder and, if wanted, they may be adjustable on the shaft so as to allow the mutual movement of the knife-holders to be varied. For fixing the knives in the respective holder the following disposition is made.

In order to make as little resistance as possible the knives are in the shape of bands. They are also provided with a hole at each end. The knives are mounted in slits 24 of the frames 6, 7, Figures 1 and 6, so that their ends extend somewhat beyond the same. In this embodiment the slits consist of notches made in exchangeable linings 23, all of which have the same width. Figure 7 shows two linings separately. The notches are marked by 25. Further the knives are threaded on spindles 26. For jamming and holding the knives firmly in the frames 6, 7 the distance between the frames may be increased by nuts 27 being rotated. Thereby the spindles 26 are tightened against the linings 23 which in their turn tighten against plane surfaces of the frames 6, 7. Such a surface is clearly shown in Figure 5 and marked by 28. On each side of the linings there are side-pieces 29, and screws 30 pass through the said side-pieces and the linings. By tightening nuts 31 on the said screws the linings are tightened against the knives, and for this reason the depth of the notches 25 should be somewhat smaller than the thickness of the knives. The notches may also be omitted but they involve the great advantage of the knives getting a support against the pressure from the meat when the same is being fed forward. It will be understood that the meat may advantageously be fed mechanically step by step, though for the sake of simplicity the machine is shown with manual feeding means comprising a piston 32 which is pushed by a handle 33.

In order that the resistance to the cutting operation may be reduced as much as possible the knives are placed at different depths in the holders as shown in Figure 1, see the holder to the right. Thereby the meat does not encounter all knives of the same group at the same time but successively. By readjusting the linings 23 the knives may be placed at different depths in zigzag, stepwise or in any aggroupment for cutting successively. For reducing the resistance still more they may also be placed obliquely, as shown in Figure 1, (see the holder to the left), that is to say, they may be in the cutting plane at more or less than a right angle to the direction of motion. Thus, they will act approximately as a bread-knife or the like, which is, moved to and back by the hand. If a knife breaks or otherwise becomes useless it may be easily removed and another inserted instead thereof.

In the drum walls, linings 34, Figures 6, 8, 9, are inserted between the knives for filling up as much as possible the opening 35 made for each group of knives in the respective drum wall, in order that meat may not stick on the knives and follow them. The said linings also support and guide the knives laterally. Figures 6 and 8 show how the linings are fastened to the drum wall. Figure 9 shows a lining separately. Each lining 34 has a projection 36 at each end and resting against a surface 37 running deep in the drum wall across the drum. All linings are fastened by strips 38 being provided across the projections and tightened by screws 39, one at each end of each strip. The openings 40 between the linings are so proportioned as to allow the knives to run easily. If a greater or smaller number of knives than that shown in the drawing is to be used the linings 34 and also the linings 23 are replaced by others of a suitable width.

The part of the machine described above acts in the following manner.

After the meat has been laid down into the groove 2 the same is closed by a cover, not shown. Then the meat is pushed towards the knives by the piston 32. It encounters first the knives 4 of the first row, to the right in Figure 1, then the knives 4 of the second row and so on. Thereby it is cut into slices. The said slices then encounter the knives 5 which are placed at different depths to the knives 4, and they are cut into strings which are then cut into cubes. In cutting machines heretofore known the operation last mentioned has mainly been performed by rotatable and lamellar knives. However, such knives have several inconveniences, namely that they run heavily, cut unevenly and are expensive. According to the present invention the said operation is performed by a shave 41 (several ones may also be used) which is two-edged so that it is able to cut at both sides. It is fixed to a holder 42 mounted in two arms 43, 44 pivoted in a part 45 of the machine frame. The arm 43 belongs to a bell crank lever, the other arm 46 of which carries a roller 47 running in a curved groove 48 of a disc 49 rotating with the shaft 16. The curve has such a shape as to impart to the knife a reciprocating and also an up- and downward motion in front of the mouth of the drum 3. Figure 2 shows the knife in one extreme position and Figure 3 shows it in the other extreme position. Each time the knife is in one of the said positions the meat is fed forward for a distance corresponding to the thickness to be cut off. The knife 41 runs in a notch 55, Figure 4, at the upper wall of the drum and in a corresponding notch at the lower wall of the drum. In this embodiment the said notches are produced by a strip 50 placed in front of each wall being provided with a longitudinal groove. The two strips are fastened by screws 51, for which there are threaded holes 52 at the end of the drum. By suitably shaping the curved groove 48 the knife 41 may also have a swift up- and downward motion at the same time as it passes past the opening, whereby the cutting action of same is augmented. On the whole, the use of a curved groove for the motion involves a great advantage as it is thereby possible to fashion the movement at pleasure. The knife 41 is disengaged for being exchanged or ground by loosening the screws 56 inserted in the holder 42 each through one hole of the knife. The said knife has the great advantage of its being procured or exchanged for a fraction of the costs demanded by a rotatable knife.

I do not wish to be limited as to details of construction, as they may be modified in many particular parts without departing from the spirit of my invention.

Having now described my invention, what I claim as new and desire to secure by Letters Patent is:

1. Machine for cutting meat into small cubes, including a drum in which the meat is fed forward and a shave device, said device being mounted in front of the mouth of the drum and comprising a movable holder for the knife and a driving means by which the knife performs a reciprocating motion across the mouth of the drum and along a curved path, part of which lies in a substantially horizontal direction and another part of which lies in a substantially vertical direction.

2. Machine for cutting meat into small cubes, including a drum in which the meat is fed forward and a shave device, said device being mounted in front of the mouth of the drum and including a movable holder for the knife, said knifeholder being mounted upon two swingable arms, one of which belongs to a bell crank lever, the other arm of which lever is cam-controlled in order to impart to the holder a reciprocating motion along a curved path, part of which lies in a substantially horizontal direction and another part of which lies in a substantially vertical direction.

3. Machine for cutting meat into small cubes, including knives crossing each other and adapted to reciprocate through a drum in which the meat is fed forward, the said knives being exchangeably and by groups fixed in cross-pieces, there being two such cross-pieces for each group of knives, one on each side of the drum, the said cross-pieces being secured at a distance corresponding to the length of the knives, and having a breadth considered in the feeding direction, which permits the knives to be placed in said cross-pieces at different mutual depths considered in said direction, each said cross-piece including a frame placed parallel with a side of the drum, linings being provided across the said frame between the knives, the said linings being kept together and tightened upon the knives by lateral pieces and screw bolts piercing them, and the knives being provided with holes adapted to receive spindles which, in turn, rest against the linings so that the knives may be stretched taut upon the distance between the cross-pieces being increased.

In witness whereof, I have hereunto signed my name.

CARL ALFRED FERDINAND LINDE.